INVENTOR:
FRANKLIN J. MORITH,
BY
ATTORNEYS.

April 10, 1945.  F. J. MORITH  2,373,138
LINE SHAFT RATIO CHANGER
Filed Dec. 14, 1940  3 Sheets-Sheet 3

INVENTOR:
FRANKLIN J. MORITH,
BY
ATTORNEYS.

Patented Apr. 10, 1945

2,373,138

UNITED STATES PATENT OFFICE 2,373,138

LINE SHAFT RATIO CHANGER

Franklin J. Morith, Batavia, N. Y.

Application December 14, 1940, Serial No. 370,181

4 Claims. (Cl. 103—42)

This invention relates to power transmissions and particularly to an improvement in a line shaft ratio changer.

It is a broad object of my invention to provide a device for transmitting power from a drive shaft to a driven shaft, with varying ratios, and without the conventional type of gear transmission.

A further object of my invention is to provide a transmission or line shaft ratio changer of the character described which affords an infinite number of ratios between the drive shaft and the driven shaft.

A further object of the invention is to provide a transmission or line shaft ratio changer of the character described which eliminates the need for a clutch, and in which the ratio between the drive shaft and the driven shaft may be automatically varied in direct response to the load on the driven shaft.

My invention is applicable to automobiles, trucks and other types of power driven vehicles, including aircraft, watercraft, all kinds of machine shop equipment, and a wide variety of uses where it is desired to provide either a manually controlled or an automatically controlled ratio changer in a line shaft.

Other objects and advantages of the invention will become apparent as the description proceeds.

Figure 1:
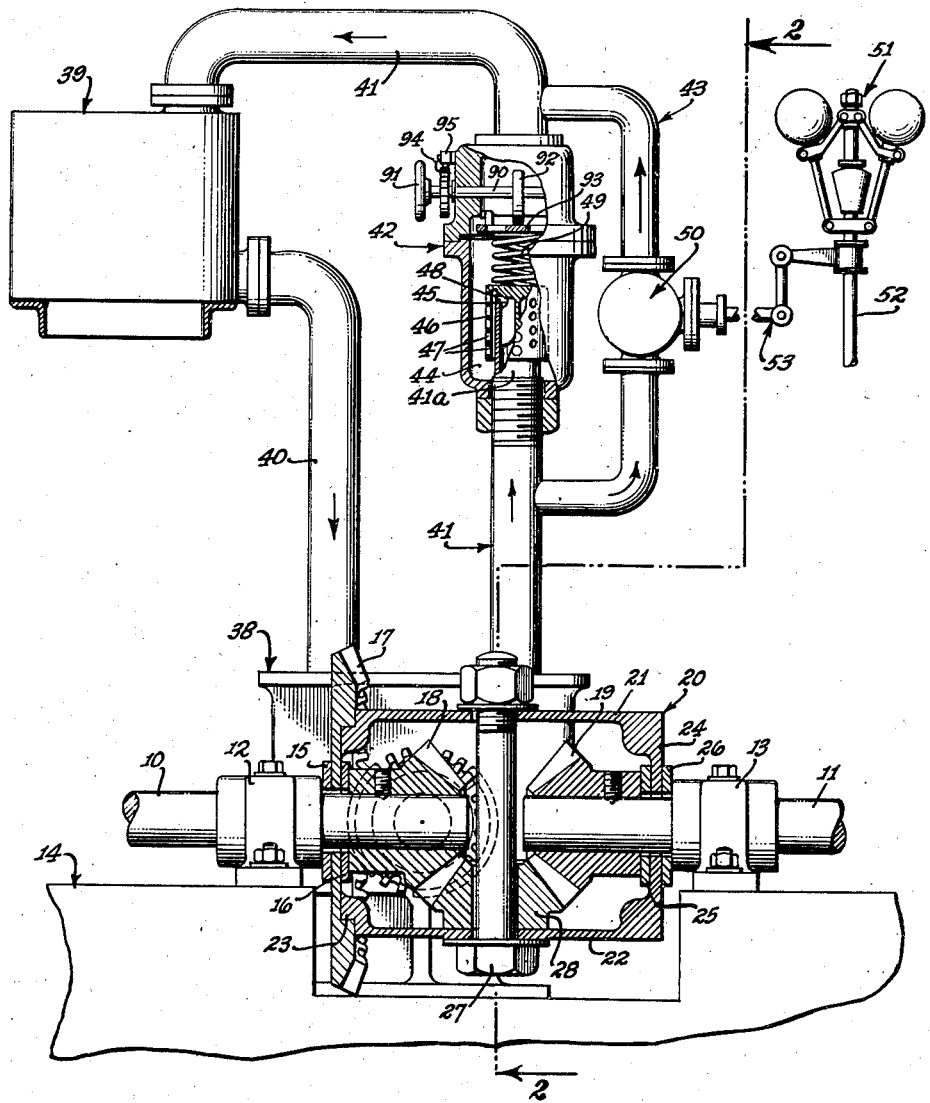
Figure 1 is a vertical sectional view of the invention.

In the form chosen for illustration, which is by way of example only, I show a drive shaft 10 and a driven shaft 11 which are mounted in bearings 12 and 13, respectively, secured to a base or frame 14, the latter being optionally a part of a transmission housing, or a table, bench, lathe, or ordinary framework, depending upon the application of the invention.

Rotatably mounted on the drive shaft 10 and preferably between thrust collars 15 and 16 is a ring gear 17. Rigidly mounted on the drive shaft 10 is a bevel gear 18. A complementary bevel gear 19 is rigidly mounted on the driven shaft 11.

A cage 20, which in the form illustrated is rectangular comprising parallel longitudinal bars 21 and 22 and ends 23 and 24 is welded or otherwise rigidly affixed to the ring gear 17 at the end 23 or at any point along the bars 21 and 22, and is mounted at the end 24 for free rotation on the driven shaft 11, preferably between spacing or thrust collars 25 and 26 which may be employed as bearing members. Other forms of bearings or bushings may be employed.

A bolt 27 is mounted between the bars 21 and 22, and provides a spindle bearing for a freely rotating intermediate spider gear 28 which constantly meshes with the gears 18 and 19. I may employ a similar spider gear at the opposite end of the spindle, or may utilize a form of spindle which will accommodate more than two spider gears.

Figure 2:
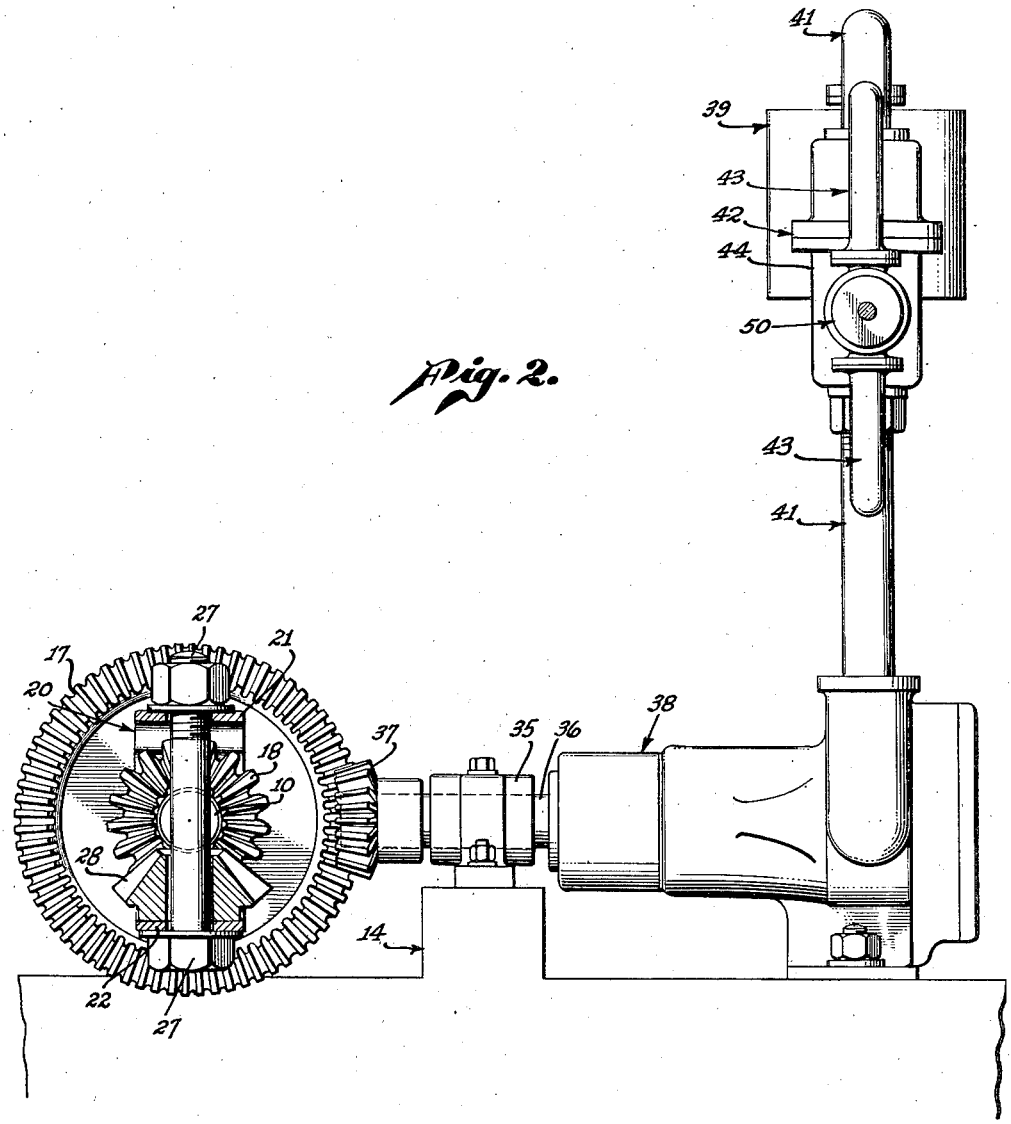
Figure 2 is an end view partly in section taken on the line 2—2 of Figure 1.

Referring to Figure 2, at one side of the ring gear 17 is positioned a bearing 35. This bearing may be mounted upon a part of the frame 14. The bearing rotatably supports a shaft 36 to which is keyed at its forward end a bevel gear or pinion 37, the latter constantly meshing with the ring gear 17. The shaft 36 also forms a part of or is coupled with a fluid pump or other governing device 38 which may be mounted upon the same frame 14. This fluid pump 38 may be of any conventional construction, forms of which are well known. By way of example only, it may be a conventional type of gear pump, the essential features being that the pump shaft 36 may be rotated to pump fluid, such for example as oil, if the oil line is partially or fully opened; but which is locked against rotation, or its rotating speed reduced, when the oil line is fully closed or partially opened respectively.

The oil line comprises a reservoir and radiator 39 which may be of any conventional design. The incorporation of the radiator in conjunction with the reservoir is for the purpose of cooling the oil. Oil is delivered from the reservoir and circulated through a pipe 40 to the pump 38 and returns from the pump through a pipe 41. Interposed in the pipe 41 is a pressure relief valve 42 which will be subsequently described in detail, and a by-pass 43 also to be described, which provides for a by-pass around the pressure relief valve.

The pressure relief valve 42 comprises a cylindrical chamber 44 into which the lower section 41a of the pipe 41 partially extends. The upper end of the section 41a is preferably beveled and ground to provide a valve 45. A valve member 46 having perforations 47 in its side walls is formed with a valve closure member 48 adapted to seat in the valve seat 45 of the pipe section 41a. The valve member 46 has a sufficiently large diameter so that when it is placed over the end of pipe section 41a there is a clearance between the pipe section and the valve member for the passage of oil. The valve member 46 is normally pressurably urged against the upper end of the pipe section 41a by a compression spring 49. The correct tension of this spring should be directly related to the load imposed upon the bevel gear 37 by the ring 17 in the operation of the device as will be subsequently explained in detail.

I may utilize a tensioning means comprising a shaft provided with a knob 91 and actuating a cam 92 which pressurably engages a perforated plate 93 resting on the spring. A notched wheel 94 cooperating with a latch 95 secures the shaft against unintended rotation. Any other suitable form of tensioning adjustment may be employed.

The by-pass 43 includes a control valve 50 which may be manually operated, or as illustrated in the drawings may be operated automatically by some means such for example as centrifugal governor 51. If the governor 51 is employed it may be operated by a rotary power source 52 deriving its rotation from the drive shaft 10, in any desired manner. The governor 51 and the valve 50 may be of conventional design and coupled through suitable linkage 53, so that the valve 50 is fully opened when the governor is idle, and progressively closes as the speed of the governor increases, so that at any pre-determined speed of the governor the valve becomes fully closed.

The operation is as follows: Power from any suitable source is used to drive the drive shaft 10, and in the form of the invention illustrated, this power may be transmitted to the driven shaft 1 in any ratio between 1 to 1 and infinity, which practically means that there is a complete range of ratio change between 1 to 1 and zero.

In normal operation the device is commonly utilized in a manner by which at the start the drive shaft is rotating and the driven shaft is idle, and the driven shaft is gradually brought up to the desired rotational speed. Moreover, during operation, the ratio between drive shaft and driven shaft is variable automatically depending upon the load encountered by the driven shaft. This, for example, will effect an automatic ratio change if the transmission is employed in an automobile, when a grade is encountered, or in starting the automobile; or when the transmission is employed in a lathe or other machine equipment, the ratio in the line shaft will automatically vary with the load encountered in the lathe as milling operations for instance may vary in depth of cut. These illustrations are by way of example only and are not intended to limit the wide application of the invention.

Assuming that the drive shaft 10 is rotating, and the oil line is opened for free flow of oil through the pump, the ring gear 17 and the bevel gear 18 are rotating with the drive shaft 10. Inasmuch as the free rotation of the ring gear 17 causes similar rotation of the cage 20, the spider gear 28 rolls with the bevel gear 18 and has no driving effect on the bevel gear 19. Consequently the bevel gear 19 and the driven shaft 11 receive no power from the drive shaft 10 and remain idle.

Assuming the opposite extreme, that is to say the oil line 41 being closed and consequently locking the pump 38 against rotation, which results in the shaft 36 and the pinion 37 remaining stationary, this has the effect of locking the ring gear 17 against rotation. As a result, the cage 20 is also held against rotation, and as will be readily seen, rotation of the drive shaft 10, is communicated through the bevel gear 18, the spider gear 28, the bevel gear 19, and thus to the driven shaft 11, in a 1 to 1 ratio.

Intermediate drive ratios between the drive shaft 10 and the driven shaft 11 are obtained by permitting the ring gear 17 and consequently the cage 20 to rotate at varying speeds. The speed of rotation of the ring gear 17 is controlled through the pinion 37, the pump 38, the oil line 41 and the pressure relief valve. In other words, the resistance set up in the oil line which the pump has to overcome, effects rotational control of the ring gear 17 and consequently the ratio between the drive shaft 10 and the driven shaft 11.

Resistance in the oil line 41 is automatically controlled by the pressure relief valve which begins to function when the by-pass valve 50 is closed. Oil pressure in the direction of the arrow in the lower section of the line 41 raises the cup 46 against the pressure of spring 49 and permits oil to flow into the cup and between the cup and pipe section 41a, as well as through the apertures 47, into the chamber 44, thence through the upper section of the line 41 into the radiator and reservoir 49. From the radiator and reservoir the oil is recirculated through the pipe 40 to the pump. The heavier the pressure in the lower section of line 41 the higher the cup 46 is raised, and the freer the oil flows through this pressure relief valve 42. As the pump pressure decreases, the cup 46 tends to lower, and the oil flow is less. The spring 49 having been readjusted as to tension, or regulated according to working conditions, causes a desired balance to be maintained by the pressure relief valve, so that the ratio between drive shaft 10 and driven shaft 11 automatically varies according to the load on the driven shaft.

As previously described, the by-pass valve 50 may be manually operated; and it may be used as the control for the oil line without the pressure relief valve 42; but if the invention is to be applied to a motor vehicle and it is desired to provide automatic starting of the vehicle without the use of a clutch, I may utilize the governor control 51 illustrated in Figure 1.

Here, assuming that the shaft 52, which derives its rotation from the drive shaft of the automobile, is rotating at idling speed, the governor 51 does not have sufficient force to close the valve 50 and consequently the valve remains fully open. This as previously described, results in a free circulation of the pump fluid and consequently no transmission of power to the driven shaft 11. When the operator opens the throttle of the motor, and the speed of shaft 52 is thus increased, the governor 51 comes into play and gradually closes the by-pass valve 50. As the valve 50 closes, the fluid line 41 sets up resistance to the pump 38, which resistance is automatically balanced by the pressure relief valve 42, and rotation of the ring gear 17 is gradually retarded as the motor vehicle moves forward, until under normal level driving conditions the ring gear 17 may be held stationary and a 1 to 1 drive ratio be maintained. As long as a predetermined rotational speed is maintained on the shaft 52 of the governor, the by-pass valve 50 remains closed, and when the speed is sufficiently reduced, the governor causes the valve 50 to again open, thus breaking the transmission of power from the drive shaft 10 to the driven shaft 11.

Figures 3, 4:
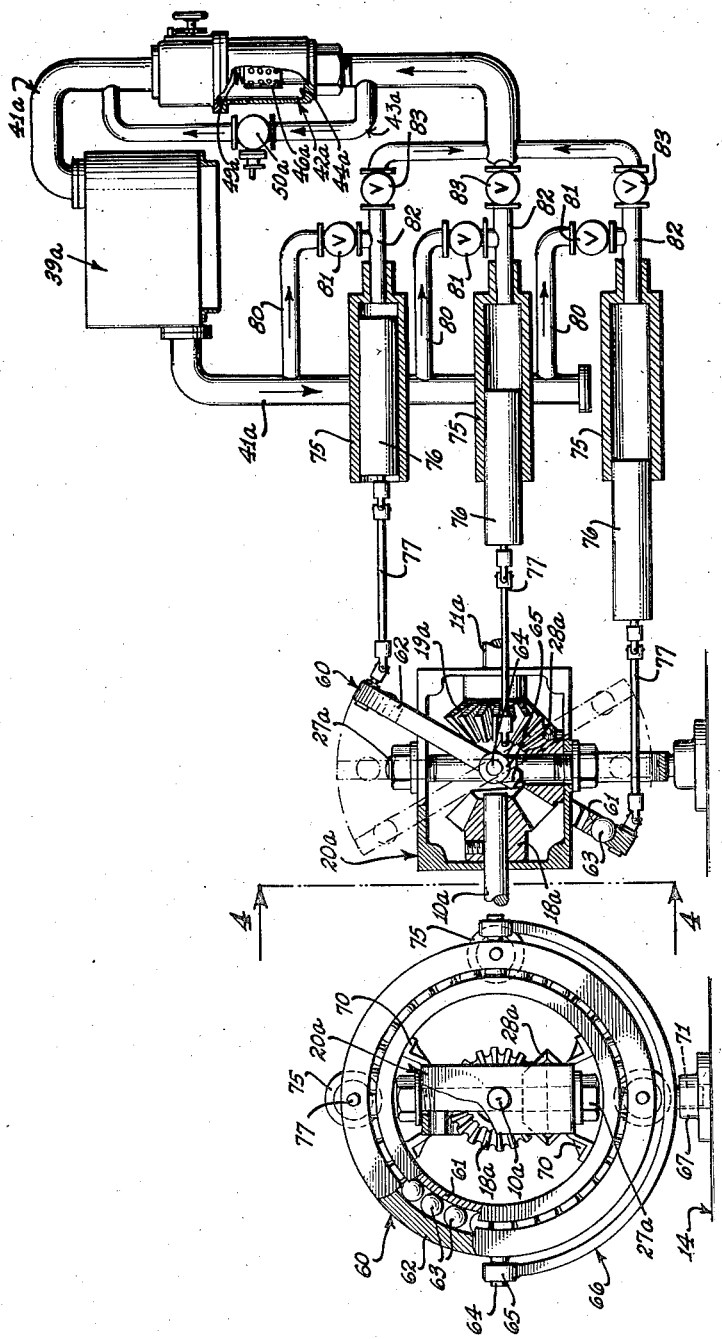
Figure 3 is a side elevation partly in section of a modified form of the invention.
Figure 4 is an end view partly in section taken on the line 4—4 of Figure 3.

Referring to the modified form of my invention illustrated in Figure 3, I provide a drive shaft 10a, a driven shaft, 11a, bevel gears 18a and 19a, a cage 20a, a spindle bearing bolt 27a, a spider gear 28a.

The cage 20a is rigidly secured to the inner ring of a ball race 60. This ball race comprises the inner ring or race 61, an outer ring or race 62, balls 63 being interposed therebetween. The inner ring is mounted at an angle to the axis of the cage by brackets 70 which may be welded or otherwise permanently mounted upon ring 61. The outer ring is provided with pins 64 which are rotatably mounted in bearings 65 of a semi-circular mounting bracket 66.

The bracket 66 is provided at its lower extremity with a pin 71 which is swivelly mounted in the base 67.

The outer ring 62 may thus have an oscillating motion or a wobble motion which is universal.

If this oscillating or universal wobble motion is not restricted, rotary force of the drive shaft 10a will not be imparted to the driven shaft 11a, because the cage 20a will be free to rotate with the drive shaft 10a and consequently the spider gear 28a will merely follow the bevel gear 18a.

As is the case of the preferred form of invention first illustrated, power is transmitted in varying ratios from infinity to 1 to 1 by retarding the rotation of the cage 20a. The cage 20a may be locked against rotary movement by restraining the outer or control ring 62 against oscillation or wobble motion. The cage may rotate with varying degrees of speed, depending upon resistance to oscillation or wobbling imposed upon the ring 62.

The necessary resistance is provided by a plurality of cylinders 75 in which pistons 76 reciprocate, the pistons being joined to the ring 62 by connecting rods 77 coupled by universal joints.

The cylinders are all connected to an oil line 41a which includes a by-pass 43a, a by-pass valve 50a, an automatic pressure relief valve 42a, and a radiator and reservoir 39a.

The oil line 41a includes inlets 80 and check valves 81 through which oil may be introduced to the respective cylinders by conduits 82. The conduits 82 are provided with check valves 83. Oil is thus available for supply at all times to the cylinders 75, but is checked against return by the check valves 81. Exhaust of oil from the cylinders 75 is possible at all times through the check valves 83, but cannot return through those valves. The line control is thus established at the by-pass 43a and the pressure relief valve 42a.

As previously described, when the by-pass valve 50a is fully opened the circulation of oil through the line and the cylinders is unrestricted. When the by-pass valve 50a is closed and the pressure relief valve comes into play, there is more or less restriction on the oil line 41a depending upon external operating conditions of the line shaft, and the balance for which the pressure relief valve is designed or adjusted.

In operation of the modified form of device which has been described; when the oil line is fully opened, the rotation of the cage 20a is imparted to the inner race 61, and this of course causes the outer race 62, which does not rotate, to oscillate with a compound motion on both horizontal and vertical axes in a manner to reciprocate the connecting rods 77 and the piston 76. Consequently no driving force is imparted by the drive shaft 10a to the driven shaft 11a. When, however, the pistons are retarded against reciprocation by resistance set up in the oil line, the rotation of the cage 20a is likewise retarded in corresponding degree, and the ratio of the drive shaft to the driven shaft thereupon varies as described in reference to the preferred embodiment of the invention.

Of course it must be understood that Figures 1, 2, 3, and 4 and the accompanying description, depict and describe only the method of operation which might be preferred as it is entirely practical, and, in some cases, it might be preferable to have the drive at one of the other of the three points, the driven at any of the three points and the control unit at any of the three points, giving varying gear ratios when the whole assembly is operating under such load conditions or control as to have the control unit at fixed or stationary position.

The alternative methods of operation just described make possible various fixed ratios above or below 1 to 1.

It is also understood that the described invention is in itself a clutch suitable for heavy duty work, such as on Diesel jobs either stationary or otherwise.

Having described the invention, what I claim as new and desire to secure by Letters Patent is:

1. A control element for a device of the kind described comprising a pump, a fluid line to said pump, a pressure relief valve in said line actuated in response to line pressure, a by-pass around the pressure relief valve, and means controlling the by-pass comprising a centrifugal governor opening the by-pass at relatively low speed and reducing or closing the by-pass at relatively high speed of the drive shaft.

2. In a pump for controlling the transmission of power from a drive shaft to a driven shaft through a differential gear coupling between said shafts; control means for the pump including a fluid line leading to and from said pump, a pressure relief valve in said line responsive to pump pressure, a by-pass in said line around said relief valve, and a normally open control valve in said by-pass.

3. The structure called for in claim 2 together with a centrifugal governor operatively connected to the drive shaft, and connections between said governor and the control valve to move the latter toward its closed position on increasing speed of the drive shaft.

4. A fluid control means for a pump comprising a fluid line leading to and from said pump, a pressure relief valve in said line responsive to pump pressure developed in said line, a spring opposing opening of said valve, means for adjusting the tension of said spring, a by-pass in said line around said relief valve communicating with the line at opposite sides of said valve, and a normally open control valve in said by-pass.

FRANKLIN J. MORITH.